United States Patent
Horade

(10) Patent No.: US 9,944,082 B2
(45) Date of Patent: Apr. 17, 2018

(54) INKJET PRINTING APPARATUS AND METHOD FOR CONTROLLING THE INKJET PRINTING APPARATUS

(71) Applicant: BROTHER KOGYO KABUSHIKI KAISHA, Nagoya, Aichi (JP)

(72) Inventor: Kenta Horade, Tokai (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/388,446

(22) Filed: Dec. 22, 2016

(65) Prior Publication Data

US 2017/0182780 A1 Jun. 29, 2017

(30) Foreign Application Priority Data

Dec. 25, 2015 (JP) ................... 2015-254913

(51) Int. Cl.
| | | |
|---|---|---|
| *B41J 2/165* | (2006.01) | |
| *H04N 1/00* | (2006.01) | |
| *B41J 2/01* | (2006.01) | |
| *H04N 1/04* | (2006.01) | |

(52) U.S. Cl.
CPC ....... *B41J 2/16511* (2013.01); *B41J 2/16508* (2013.01); *B41J 2/16523* (2013.01); *B41J 2/01* (2013.01); *H04N 1/04* (2013.01)

(58) Field of Classification Search
CPC ........ B41J 2/175; B41J 29/13; B41J 2/16585; B41J 2/1752; B41J 2/17553; B41J 2/1721; B41J 2/17509; B41J 29/02; B41J 29/17; B41J 2/18; B41J 2002/1856; B41J 2/16517; B41J 2/17503; B41J 2/17513; H04N 1/23; H04N 1/034; H04N 1/00
See application file for complete search history.

(56) References Cited

U.S. PATENT DOCUMENTS

| | | | |
|---|---|---|---|
| 6,508,528 B2 | 1/2003 | Fuji et al. | |
| 9,586,398 B2 * | 3/2017 | Kato | .................... B41J 2/04573 |
| 9,776,434 B2 | 10/2017 | Saikawa | |
| 2015/0049138 A1 * | 2/2015 | Aoyama | .................. B41J 29/13 |
| | | | 347/16 |

FOREIGN PATENT DOCUMENTS

JP 2013-081048 A 5/2013

OTHER PUBLICATIONS

Related U.S. Appl. No. 15/386,127, filed Dec. 21, 2016.
Notice of Allowance dated Oct. 6, 2017 which issued in related application, namely, U.S. Appl. No. 15/386,127.
Office Action dated Feb. 23, 2018 which issued in related application, namely, U.S. Appl. No. 15/867,046, 7 pages.

* cited by examiner

*Primary Examiner* — Thinh H Nguyen
(74) *Attorney, Agent, or Firm* — Scully, Scott, Murphy & Presser, P.C.

(57) ABSTRACT

In an inkjet printing apparatus, a controller causes a scanner to read an image formed on an original in response to reception of a copy instruction and generates image data representing the read image. The controller determines a standby period in response to reception of the copy instruction. In response to elapse of the standby period since the reception of the copy instruction, the controller separates a cap and an inkjet head. After the cap and the inkjet head separated each other and completion of reading at least part of the image on the original, the controller causes the recording head to eject ink droplets based on the image data.

12 Claims, 9 Drawing Sheets

INKJET PRINTING APPARATUS AND METHOD FOR CONTROLLING THE INKJET PRINTING APPARATUS

CROSS-REFERENCE TO RELATED APPLICATIONS

This application claims priority under 35 U.S.C. § 119 from Japanese Patent Application No. 2015-254913 filed on Dec. 25, 2015. The entire subject matter of the application is incorporated herein by reference.

BACKGROUND

Technical Field

The present disclosures relate to an inkjet printing apparatus which is configured to execute a copying process in which an image read by a scanner is printed on a sheet with a printer.

Related Art

Conventionally, in a field of a printing apparatus, an attempt has been made to shorten an FCOT (first copy output time), which represents a time period from depression of a start button to start a copying process to a time at which a first sheet on which an image is formed has been output (i.e., discharged from the printing apparatus). One known technique to shorten the FCOT is to control a start timing of a startup process of an image forming device so that a startup process of a reading device and the startup process of the image forming device are completed at the same time.

SUMMARY

According to such a conventional technique, a reading process following the completion of the startup process of an image reading device, and an image forming process following the completion of the startup process of the image forming device are started at the same time. However, in a practical use, there occurs a standby period before execution of the image forming process during which image data, which is to be used in the image forming process, is generated in the image reading process.

Typically, during the startup process of the image forming device which is configured to print images in accordance with an inkjet printing method, an uncap process to uncap the inkjet head and a process to cause the inkjet head to eject ink droplets are executed. Therefore, if a time period from the completion of the startup process of the image forming device to a timing at which the image forming process is actually executed is relatively long, that is, if the time period during which the image data to be used in the image forming process is generated in the reading process is relatively long, there may occur a problem that the ink is dried inside the inkjet head which has been uncapped.

According to aspects of the disclosures, there is provided an improved inkjet printing apparatus in which drying of the ink in the inkjet head as described above is suppressed, which the FCOT is shortened.

BRIEF DESCRIPTION OF ACCOMPANYING DRAWINGS

Figure 4:
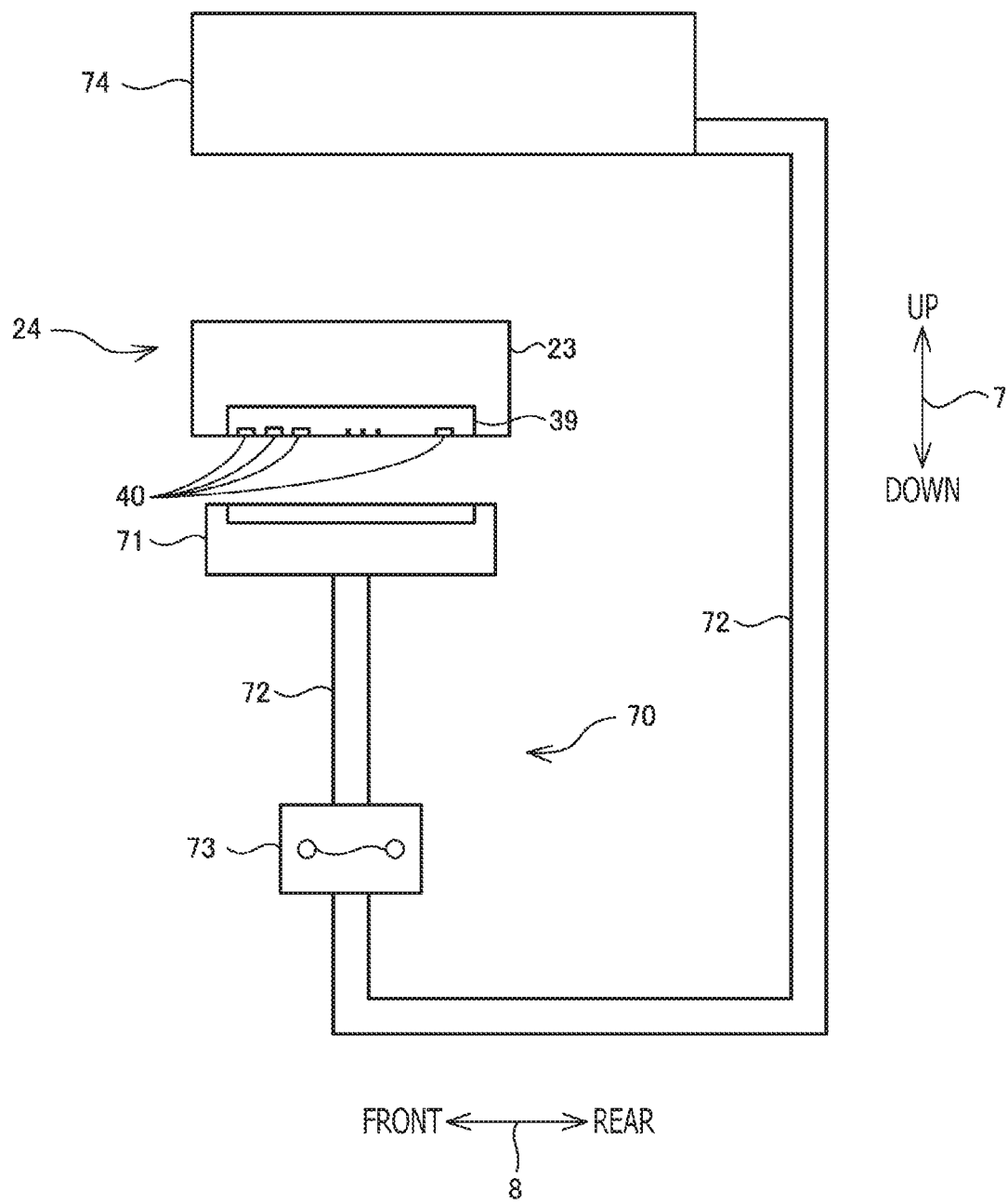

FIG. 4 schematically shows a configuration of a maintenance device of the printer of the MFP.

Figure 5A:
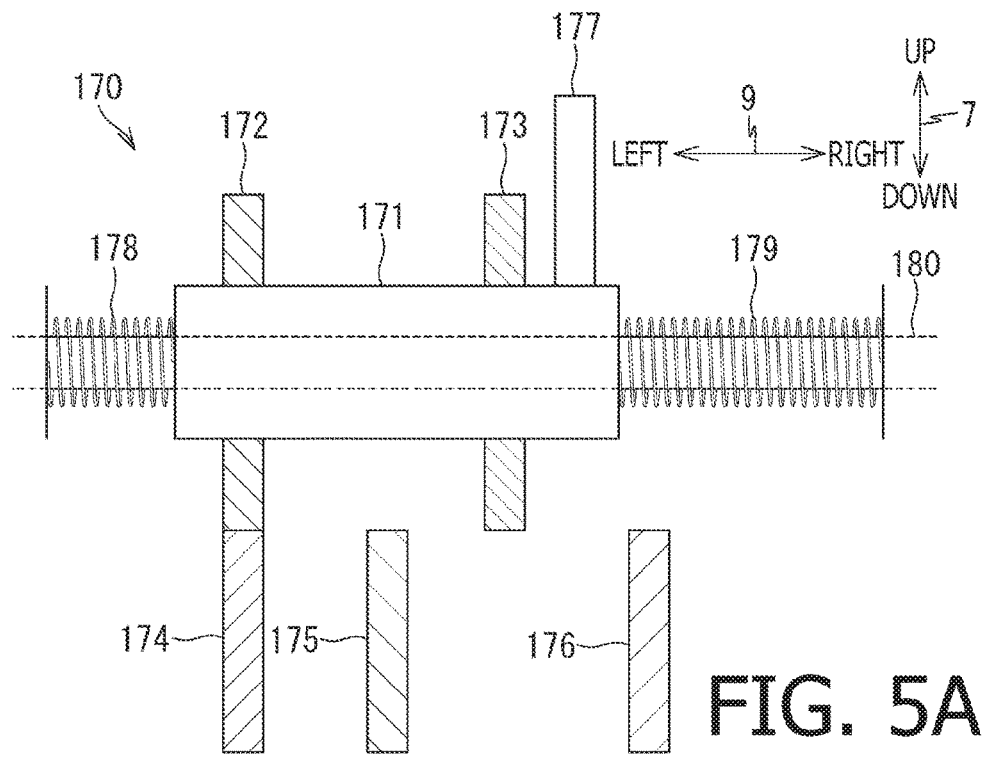

FIG. 5A schematically shows a switching mechanism at a first driving state.

Figure 5B:
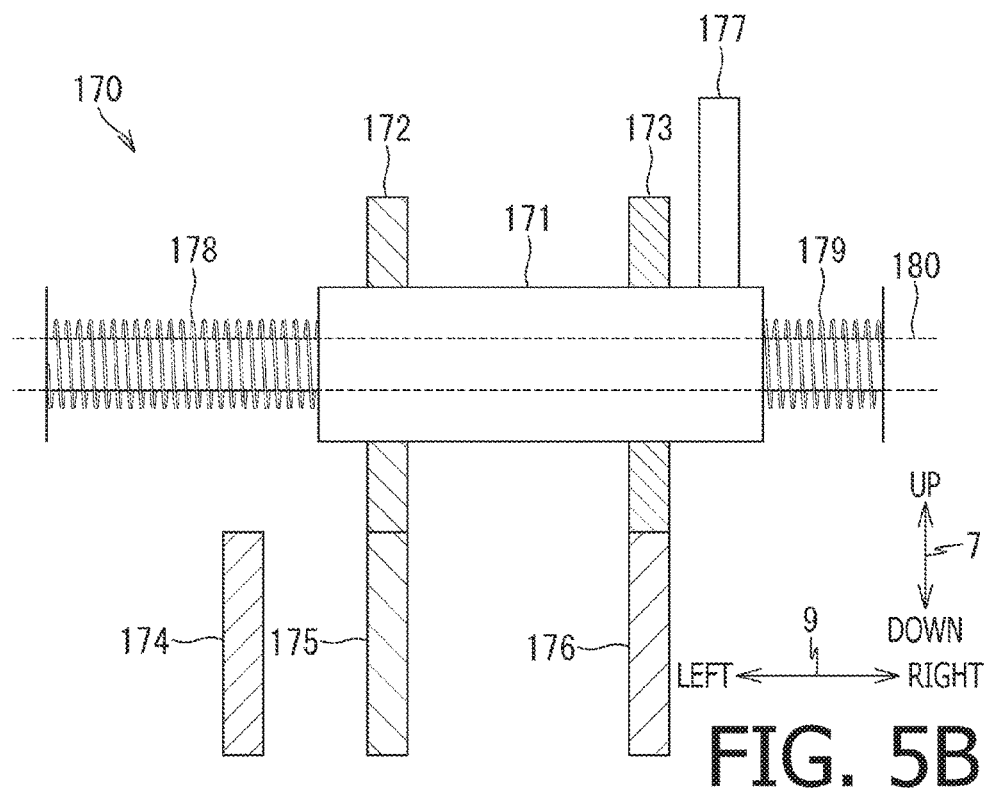

FIG. 5B schematically shows the switching mechanism at a second driving state.

Figure 6:
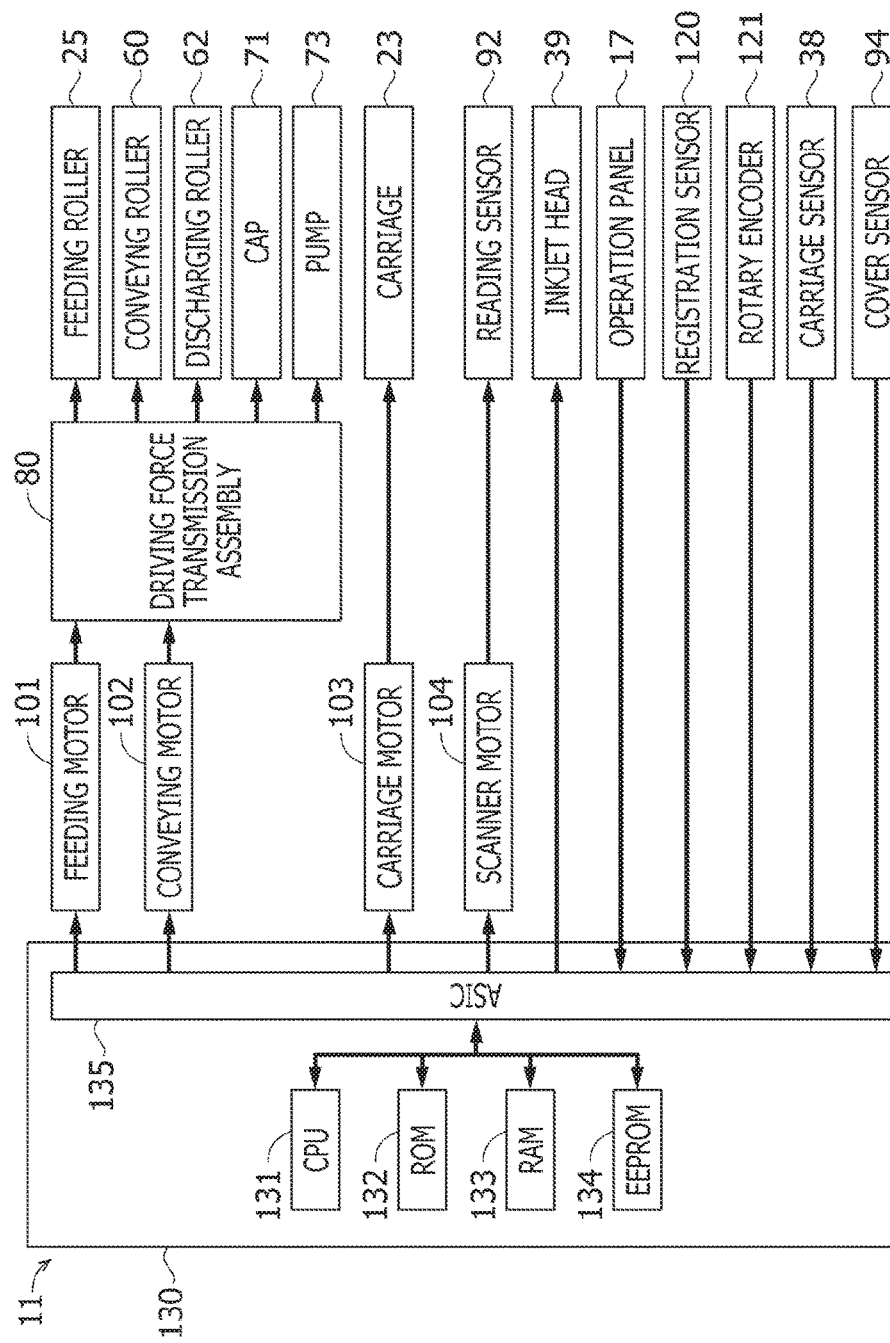

FIG. 6 is a block diagram showing a configuration of the printer.

Figure 7:
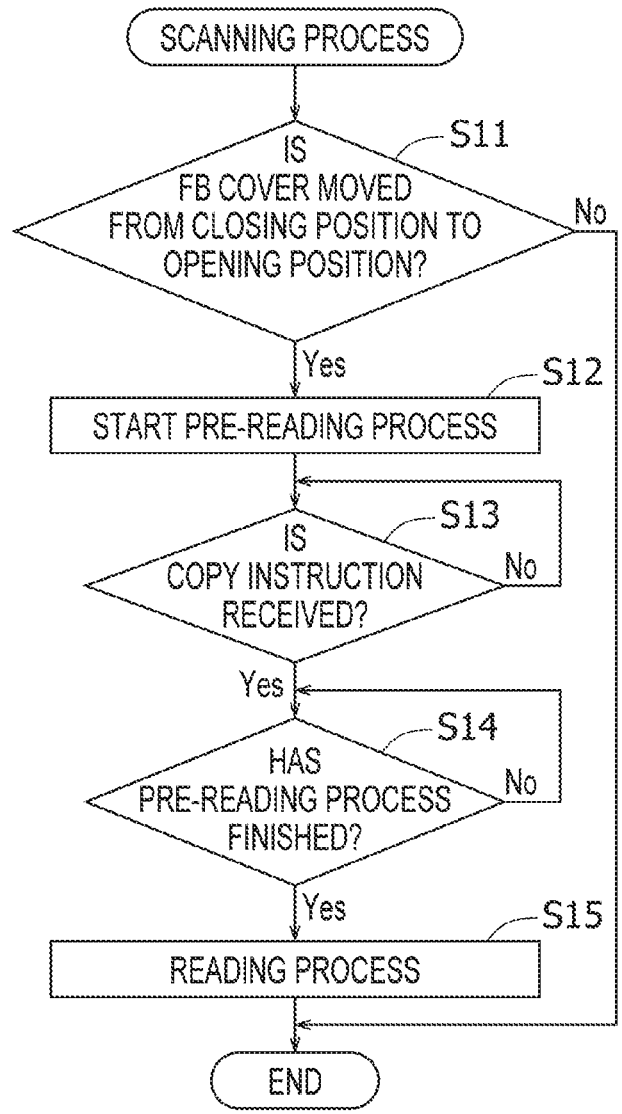

FIG. 7 is a flowchart illustrating a scanning process.

Figure 8:
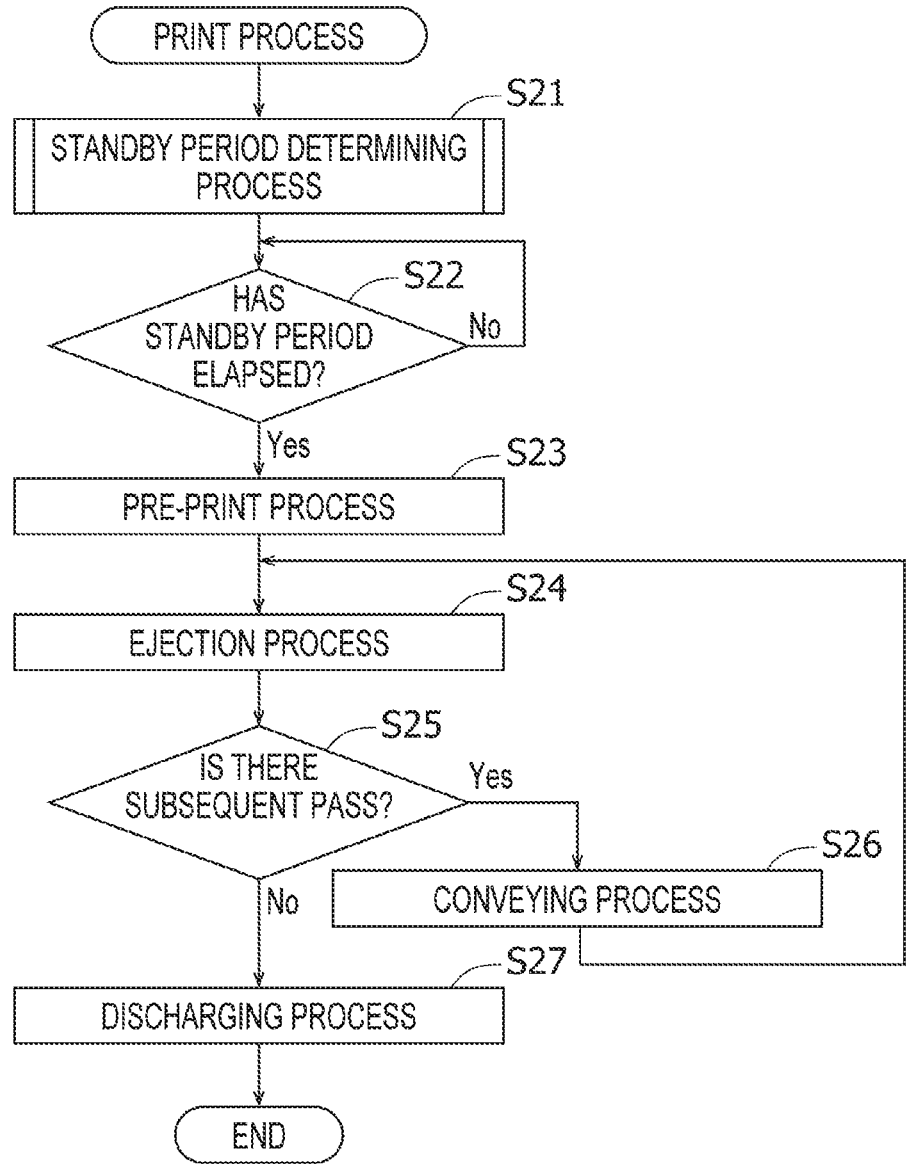

FIG. 8 is a flowchart illustrating a print process.

Figure 9:
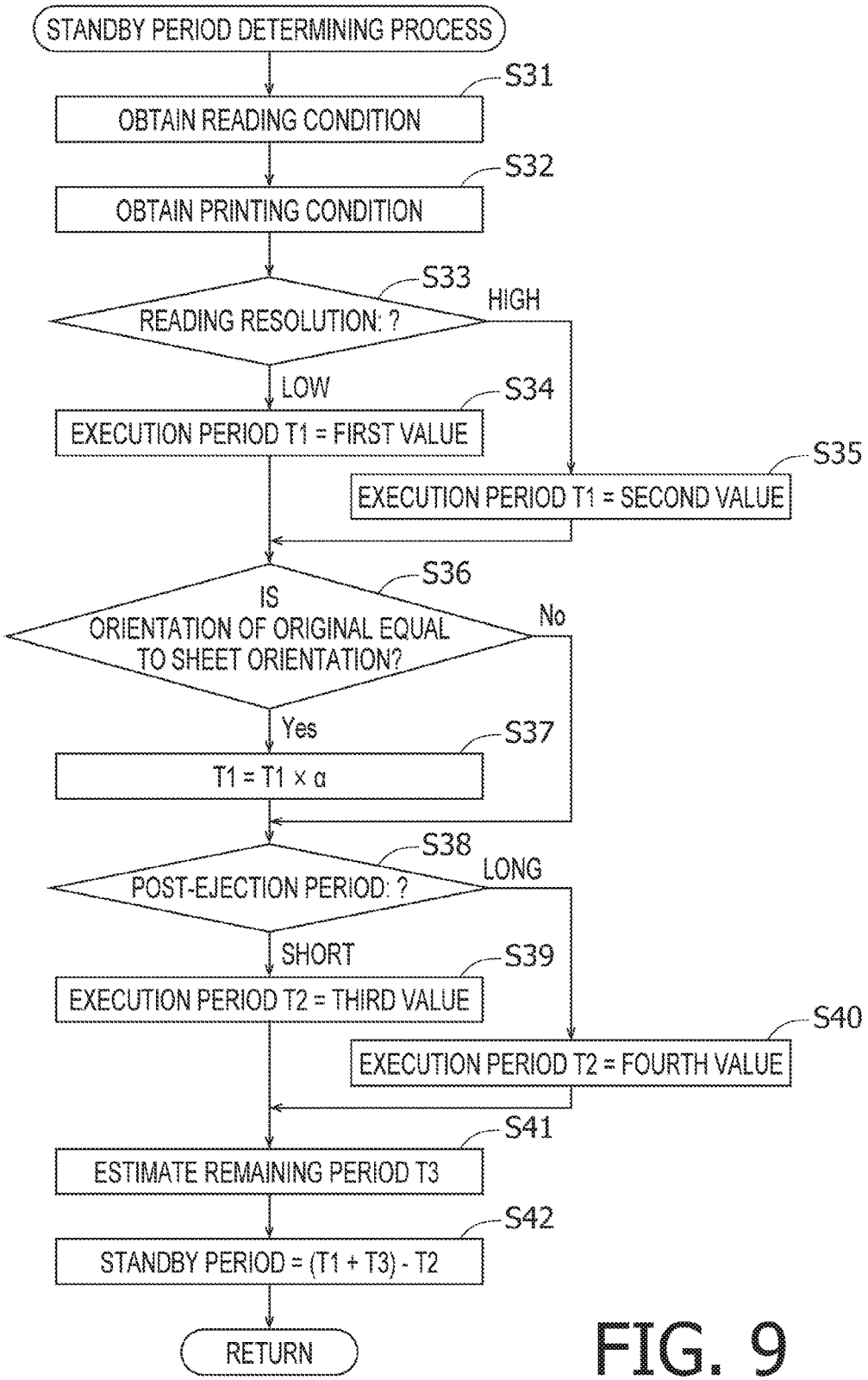

FIG. 9 is a flowchart illustrating a standby period determining process.

DETAILED DESCRIPTION

Hereinafter, an illustrative embodiment according to the disclosures will be described, referring to the accompanying drawings. It is noted that the illustrative embodiment described below is only one example according to the disclosures, and may be modified in various ways without departing from the aspects of the disclosures. In the following description, a term "direction" will be used to express a direction directed from a start point of an arrow toward an end point of the arrow, or a direction (regardless of its orientation) parallel to a line segment connecting the start point and the end point of the arrow. The former may also be expressed as an "orientation direction" in order to stress that the orientation should also be considered.

Figure 1:
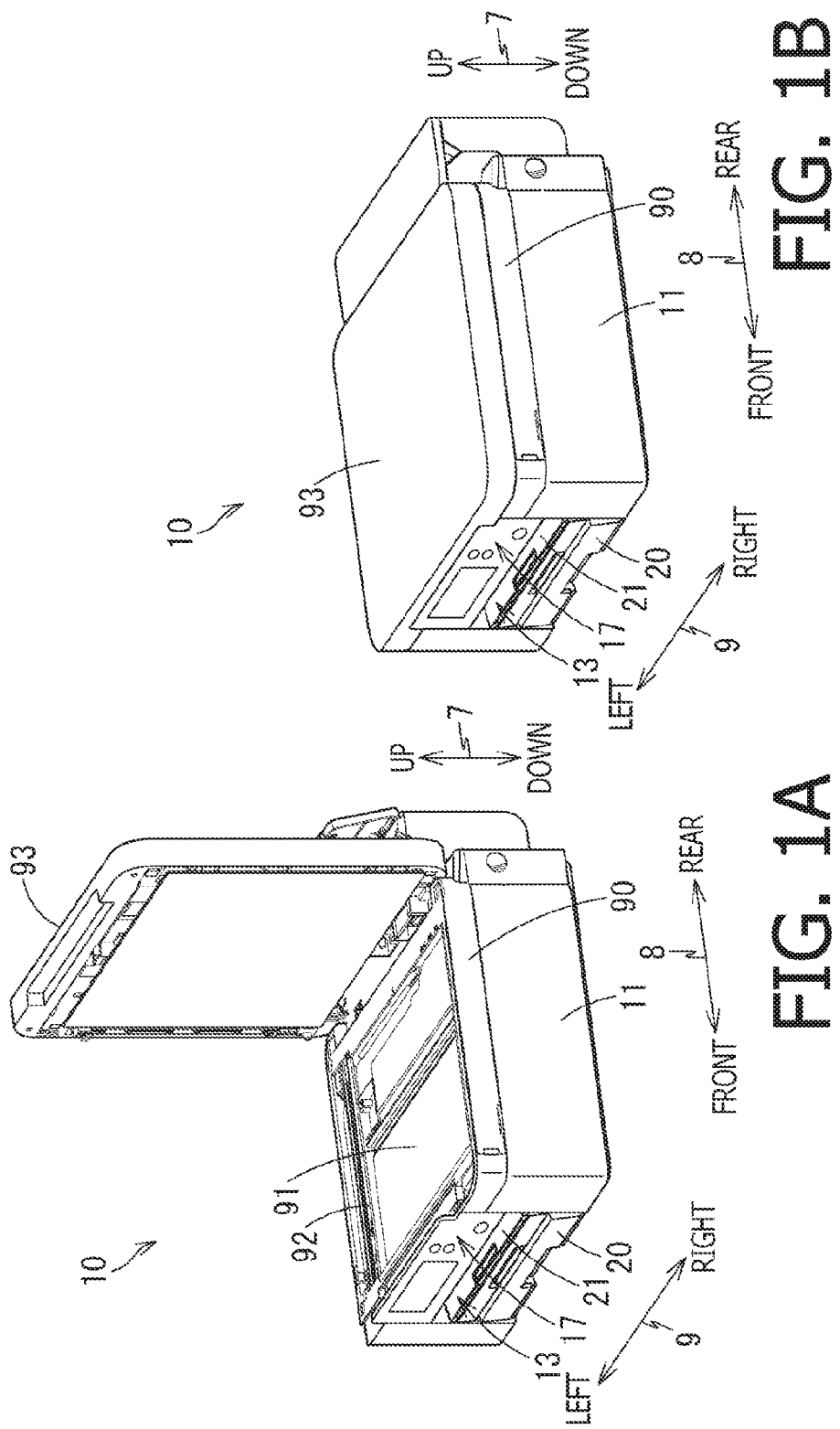
FIG. 1A is a perspective view of an MFP (multi-function peripheral) when an FB (flatbed) cover is located at an opening position.
FIG. 1B is a perspective view of the MFP when the FB cover is located at a closing position.

Further, an up-down direction 7 is defined based on a state where an MFP (multi-function peripheral) 10 is placed for used (e.g., a state shown in FIG. 1). In the state as shown in FIG. 1, a front-rear side 8 is also defined such that a side where an opening 13 is formed is a front side. Further, a right-left side 9 is defined when the MFP 10 is viewed from the front side thereof.

<Overall Configuration of MFP>

As shown in FIGS. 1A and 1B, the MFP 10 has a substantially rectangular-parallelepiped shape. The MFP 10 has a printer 11 and a scanner 90. It is noted that the MFP 10 is an example of an inkjet printing apparatus.

<Printer>

Figure 2:
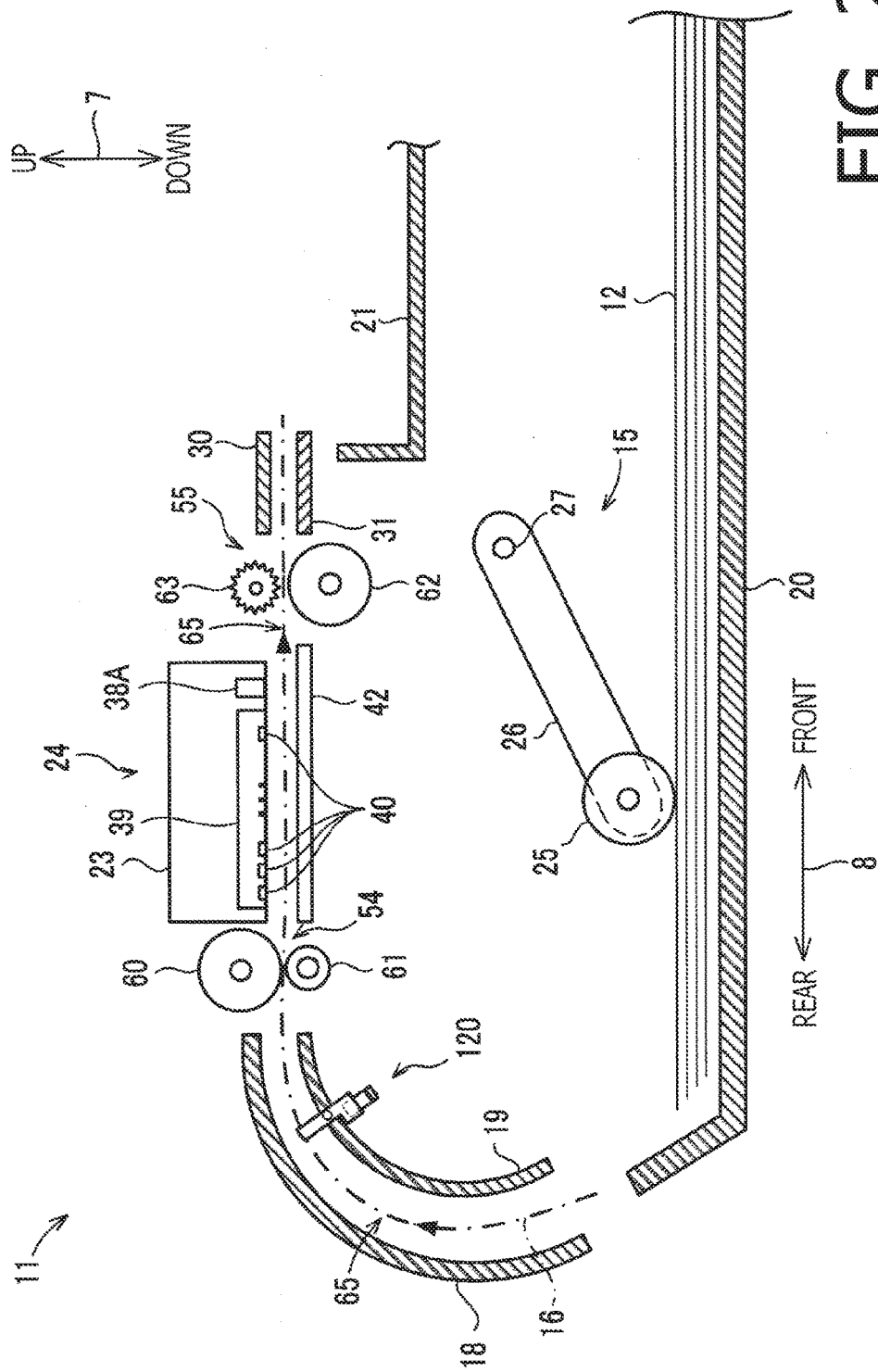
FIG. 2 is a cross-sectional side view of a printer of the MFP schematically showing an inside configuration thereof.

The printer 11 employs a so-called inkjet printing method and is configured to execute a printing operation to print images represented by image data on sheets 12 (see FIG. 2) by ejecting ink droplets thereon. As shown in FIG. 2, the printer 11 has a feeder assembly 15, a feed tray 20, a discharge tray 21, a conveying roller assembly 54, a printer assembly 24, a discharge roller assembly 55, and a platen 42. It is noted that the conveying roller assembly 54 and the discharge roller assembly 55 are examples of conveying assembly.

<Feed Tray and Discharge Tray>

On a front side of the printer 11, an opening 13 (see FIG. 1) is formed. The feet tray 20 is configured to be inserted in/withdrawn from the printer 11 in the front-rear direction 8 through the opening 13. The feed tray 20 is configured to support multiple sheets 12 in a stacked manner. The discharge tray 21 is configured to catch and support the sheets 12 discharged, by a discharge roller assembly 55, from the printer 11 through the opening 13.

<Feeder Assembly>

The feeder assembly 15 has a feeding roller 25, a feeder arm 26 and a shaft 27. The feeding roller 25 is rotatably supported at a distal end part of the feeder arm 26. The feeding roller 25 is configured to rotate to feed the sheet 12 in a conveying direction 16 (i.e., leftward in FIG. 2) when a feeding motor 101 (see FIG. 6) rotates in a forward direction. The rotation of the feeding roller 25 to feed the sheet 12 will also be referred to as a forward rotation. The feeder arm 26 is rotatably supported by the shaft 27, which is supported by a frame of the printer 11. The feeder arm 26 is urged such that the feeding roller 25 is urged toward the feed tray 20 by its own weight or an elastic force using an elastic member such as a spring.

<Sheet Conveying Passage>

A sheet conveying passage 65 is a space defined by guide members 18, 19, 30 and 31. The guide members 18 and 19 face each other, inside the printer 11, with a particular clearance therebetween, and the guide members 30 and 31 face each other, inside the printer 11, with a particular clearance therebetween. The sheet conveying passage 65 is a passage extending upward from a rear end of the feed tray 20, making a U-turn at an upper-rear part of the printer 11, and then extending frontward to reach the discharge tray 21. It is noted that a conveying direction 16 of the sheet 12 in the sheet conveying passage 65 is indicated with an arrowed one-dot line in FIG. 2.

<Conveying Roller Assembly>

The conveying roller assembly 54 is arranged on an upstream side in the conveying direction 16 with respect to the printer assembly 24. The conveying roller assembly 54 has a conveying roller 60 and a pinch roller 61, which face each other. The conveying roller 60 is driven by the conveying motor 102 to rotate. The pinch roller 61 is driven to rotate in association with rotation of the conveying roller 60. The sheet 12 is nipped by the conveying roller 60 and the pinch roller 61, and conveyed along the conveying direction 16 as the conveying motor 102 rotates forwardly and the conveying roller 60 rotates forwardly in association with the forward rotation of the conveying motor 102. It is noted that the conveying roller 60 is configured to rotate reversely in association with a reverse rotation of the conveying motor 102, which is opposite to the forward rotation of the conveying motor 102.

<Discharge Roller Assembly>

A discharge roller assembly 55 is arranged on a downstream side, in the conveying direction 16, with respect to the printer assembly 24. The discharge roller assembly 55 has a discharging roller 62 and a spur roller 63. The discharging roller 62 is driven by a conveying motor 102 to rotate. The spur roller 63 rotates in association with rotation of the discharging roller 62. The sheet 12 is nipped by the discharging roller 62 and the spur roller 63, and conveyed along the conveying direction 16 as the conveying motor 102 rotate forwardly and the discharge roller 62 rotates forwardly in association with the forward rotation of the conveying motor 102.

<Registration Sensor>

The printer 11 has a registration sensor 120 (see FIG. 2). The registration sensor 120 is arranged on an upstream side, in the conveying direction 16, with respect to the conveying roller assembly 54. The registration sensor 120 is configured to output different detection signals depending on whether the sheet 12 is present or absent at the position where the registration sensor 120 is arranged. Specifically, the registration sensor 120 transmits a high-level signal to a controller 130 (see FIG. 6) in response to detection of presence of the sheet 12 at the arranged position, while transmits a low-level signal to the controller 130 in response to detection of absence of the sheet at the arranged position.

<Rotary Encoder>

The printer 11 has a rotary encoder 121 (see FIG. 6) which is configured to output a pulse signal in accordance with rotation of the conveying roller 60 (in other words, in response to rotation of the conveying motor 102). The rotary encoder 121 is of a well-known type and has an encoder disc and an optical sensor. The encoder disc is configured to rotate in association with a rotation of the conveying roller 60. The optical sensor is configured to read the encoder disc to generate the pulse signal, and transmits the thus generated pulse signal to the controller 130.

<Printer Assembly>

Figure 3:
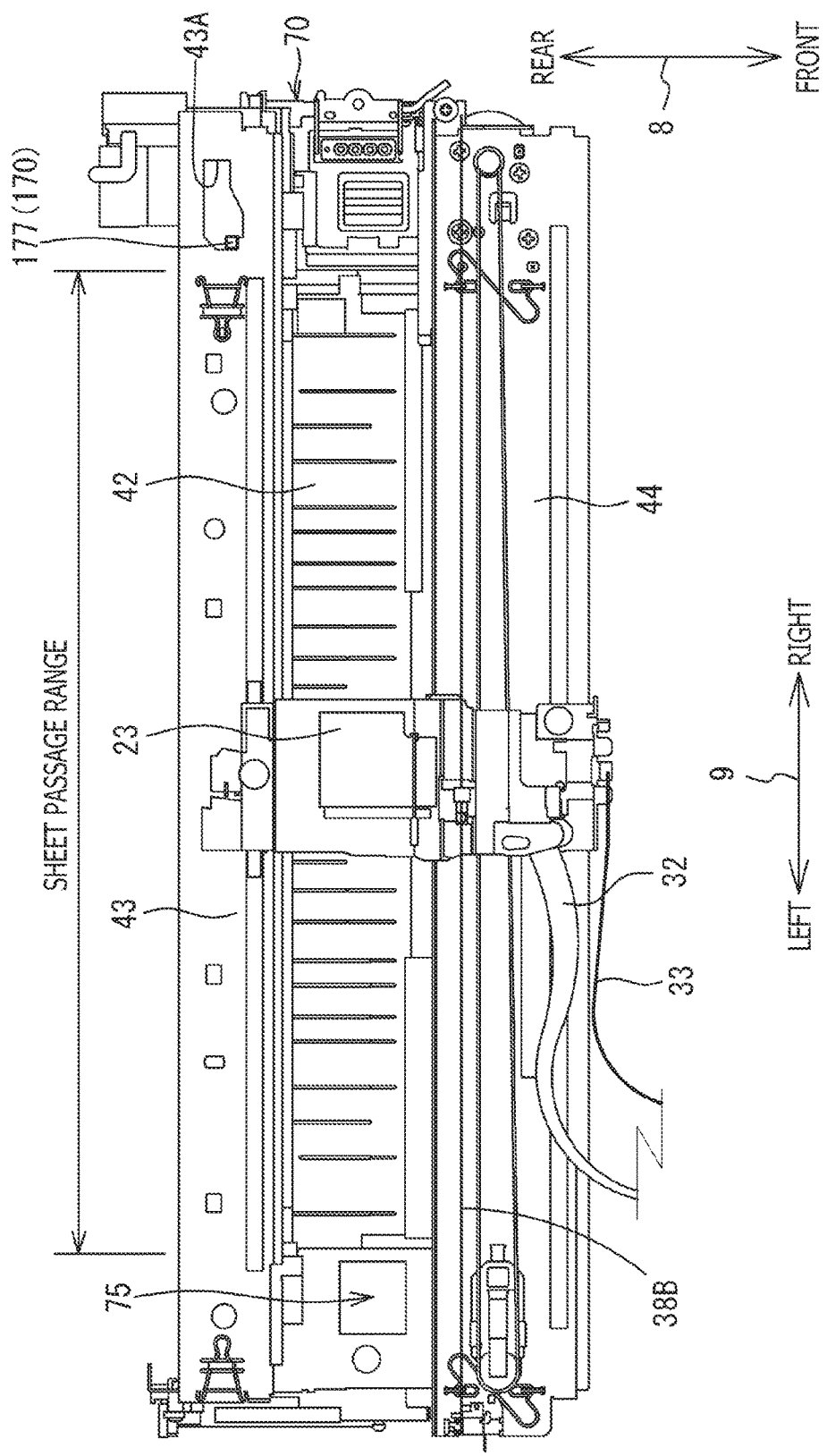
FIG. 3 is a plan view of a carriage and guide rails of the printer of the MFP.

The printer assembly 24 is arranged between, in the conveying direction 16, the conveying roller assembly 54 and the discharge roller assembly 55 as shown in FIG. 2. Further, the printer assembly 24 is arranged to face, in the up-down direction, the platen 42. The printer assembly 24 is provided with a carriage 23, the inkjet head 39 and an encoder sensor 38A. Further, to the carriage 23, an ink tube 32 and a flexible flat cable 33 are connected as shown in FIG. 3. The ink tube 32 serves to supply ink of the ink cartridge to the inkjet head 39. The flexible flat cable 33 serves to electrically connect a control circuit board implemented in the controller 130 with the inkjet head 39.

The carriage 23 is slidably supported by guide rails 43 and 44, which are arranged to be spaced in the front-read direction 8 and each of which extends in the right-left direction 9 as shown in FIG. 3. The carriage 23 is connected to a well-known belt-driving mechanism associated with the guide rail 44. The belt-driving mechanism is driven by a carriage motor 103 (see FIG. 6). That is, the carriage 23 is connected to a belt of the belt-driving mechanism, which belt is driven to circumferentially move by the carriage motor 103, thereby the carriage 23 being reciprocally moved in a main scanning direction which is parallel to the right-left direction 9.

The inkjet head 39 is mounted on the carriage 23 as shown in FIG. 2. On a bottom surface of the inkjet head 39, multiple nozzles 40 are formed. The inkjet head 39 ejects ink droplets through the multiple nozzles 40. Specifically, while the carriage 23 is moving, the inkjet head 39 ejects the ink droplets to the sheet 12 supported by the platen 42, thereby an image is formed on the sheet 12.

A belt-like encoder strip 38, which extends in the right-left direction, is attached to the guide rail 44 (see FIG. 3). The encoder sensor 38A is mounted on the bottom surface of the carriage 23 at a position where the encoder sensor 38A faces the encoder strip 38B. As the carriage 23 moves, the encoder sensor 38A reads the encoder strip 38B and generates a pulse signal, and transmits the thus generated pulse signal to the controller 130. It is noted that the encoder sensor 38A and the encoder strip 38B constitute a carriage sensor 38 (see FIG. 6).

<Platen>

The platen 42 is arranged between, in the conveying direction 16, the conveying roller assembly 54 and the discharge roller assembly 55 as shown in FIG. 2. Further, the platen 42 is arranged to face, in the up-down direction, the printer assembly 24. The platen 42 is configured to support the sheet 12, which is conveyed by at least one of the conveying roller assembly 54 and the discharge roller assembly 55, from below.

<Maintenance Device>

The printer 11 has a maintenance device 70 as shown in FIG. 3. The maintenance device 70 is used for maintenance of the inkjet head 39. Specifically, the maintenance device 70 executes a purge operation to suck the ink and/or air inside the nozzles 40 and foreign substances adhered onto a nozzle surface. It is noted that the nozzle surface is a surface of the inkjet head 39 on which the nozzles 40 are formed. In the following description, the ink and/or air inside the nozzles 40 and the foreign substances adhered onto the nozzle surface will be simply referred to as "ink and the like" for brevity. The sucked/removed ink and the like by the maintenance device 70 is stored in a waste-liquid tank 74 (see FIG. 4).

As shown in FIG. 3, the maintenance device 70 is arranged on an outer side (i.e., the right side) with respect to a sheet passage range. The sheet passage range is a range, in the main scanning direction, within which the sheet 12 conveyed by the conveying assembly 54 passes. The maintenance device 70 has a cap 71, a tube 72 and a pump 73 (see FIG. 4).

The cap 71 is made of rubber. The cap 71 is arranged to face the carriage 23 which is located on the right side with respect to the sheet passage range. Further, the cap 71 is movable between a cap position and an uncap position. When located at the cap position, the cap 71 covers the nozzle surface, while when located at the uncap position, the cap 71 is spaced from and uncovers the nozzle surface. It is noted that the cap is moved between the cap position and the uncap position by a lifting mechanism which is driven by the feeding motor 101. The tube 72 extends from the cap 71 to the waste-liquid tank 74 via the pump 73. The pump 73 is, for example, a rotary type tube pump. The pump 73 is driven by the conveying motor 102 to operate to suck the ink and the like in the nozzles 40 through the cap 71 and the tube 72, and discharge the same in the waste-liquid tank 74 though the tube 72.

<Ink Receiver>

The printer 11 has an ink receiver 75 (see FIG. 3). The ink receiver 75 is arranged at a position on the other side (i.e., left side), in the main scanning direction, with respect to the sheet passage range. The ink receiver 75 has a substantially rectangular-parallelepiped shape having an opening on an upper surface thereof. Inside the ink receiver 75, an ink absorbing member is accommodated. The ink discharged from the nozzles 40 of the inkjet head 39 toward the opening of the ink receiver 75 is caught by the ink receiver 75 and absorbed by the ink absorbing member inside the ink receiver 75.

<Driving Force Transmission Assembly>

The printer 11 is provide with a driving force transmission assembly 80 (see FIG. 6). The driving force transmission assembly 80 is configured to transmit driving forces of the feeding motor 101 and the conveying motor 102 to the feeding roller 25, the conveying roller 60, the discharging roller 62, the lifting mechanism of the cap 71 and the pump 73. The driving force transmission assembly 80 is configured by combining all or parts of gears, pulleys, an endless annular belt, a planetary gear mechanism (a pendulum gear mechanism), and a one way clutch and the like. Further, the driving force transmission assembly 80 includes a switching mechanism 170 (see FIG. 5) configured to switch destinations of the driving forces of the feeding motor 101 and the conveying motor 102.

<Switching Mechanism>

The switching mechanism 170 is configured such that the driving state can be switched between the first driving state and the second driving state. The first driving state is a state in which the driving force of the feeding motor 101 is transmitted to the feeding roller 25, but not to the lifting mechanism of the cap 71. Further, in the first driving state, the driving force of the conveying motor 102 is transmitted to the conveying roller 60 and the discharging roller 62, but not to the pump 73. The second driving state is a state in which the driving force of the feeding motor 101 is transmitted to the lifting mechanism of the cap 71, but not to the feeding roller 25. Further, in the second driving state, the driving force of the conveying motor 102 is transmitted to the conveying roller 60, the discharging roller 62 and the pump 73.

The switching mechanism 170 is arranged on one side, in the main scanning direction, with respect to the sheet passage range as shown in FIG. 3. Further, the switching mechanism 170 is arranged below the guide rail 43. As shown in FIGS. 5A and 5B, the switching mechanism 170 has a slidable member 171, driving gears 172 and 173, driven gears 174, 175 and 176, a lever 177, springs 178 and 179 (which are examples of an urging member) and a supporting shaft 180.

The slidable member 171 is a substantially cylindrical member and is supported by the supporting shaft 180 which extends in the right-left direction (see FIGS. 5A and 5B). The sliding member 171 is configured to be slidable in the right-left direction 9 along the supporting shaft 71. The sliding member 171 rotatably supports the driving gears 172 and 173, which are configured to be independently rotatable on the outer circumferential surface of the slidable member 171, at different positions in the right-left direction. It is noted that, in the right-left direction, the slidable member 171 moves integrally with the driving gears 172 and 173.

The driving gear 172 rotates as the rotational driving force of the feeding motor 101 is transmitted. It is noted that the driving gear 172 engages with one of the driven gears 174 and 175. Specifically, the driving gear 172 engages with the driven gear 174 when the switching mechanism 170 is in the first driving state (see FIG. 5A), while the driving gear 172 engages with the driven gear 175 when the switching mechanism 170 is in the second driving state (see FIG. 5B).

The driving gear 173 rotates as the rotational driving force of the conveying motor 102 is transmitted. It is noted that the driving gear 173 disengaged from the driven gear 176 when the switching mechanism 170 is in the first driving state (see FIG. 5A), while the driving gear 173 engages with the driven gear 176 when the switching mechanism 170 is in the second driving state (see FIG. 5B).

The driven gear 174 engages with a gear train that rotates the feeding roller 25. That is, the rotational driving force of the feeding motor 101 is transmitted to the feeding roller 25 as the driving gear 172 engages with the driven gear 174. Further, the rotational driving force of the feeding motor 101 is not transmitted to the feeding roller 25 when the driving gear 172 is disengaged from the driven gear 174. The driven gear 175 engages with a gear train which is configured to drive the lifting mechanism of the cap 71. Further, the rotational driving force of the feeding motor 101 is not transmitted to the lifting mechanism of the cap 71 when the driving gear 172 is disengaged from the driven gear 175.

The driven gear 176 engages with a gear train that drives the pump 73. That is, the rotational driving force of the conveying motor 102 is transmitted to the pump 73 as the driving gear 173 engages with the driven gear 176. Further, the rotational driving force of the conveying motor 102 is not transmitted to the pump 73 when the driving gear 173 is disengaged from the driven gear 176. The rotational driving force of the conveying motor 102 is transmitted to the conveying roller 60 and the discharging roller 62 with bypassing the switching mechanism 170. That is, the conveying roller 60 and the discharging roller 62 are driven by the rotational driving force of the conveying motor 102, regardless of the driving state of the switching mechanism 170.

The lever 177 is supported by the supporting shaft 180 at a position, in the right-left direction 9, on the right side of the slidable member 171. Further, the lever 177 is configured to slide in the right-left direction 9, along the supporting shaft 180. Further, the lever 177 protrudes upward. A tip end of the lever 177 extends through an opening 43A formed on the guide rail 43 and reaches a position at which the tip end of the lever 177 could contact the carriage 23 in the right-left direction 9.

The springs 178 and 179 are supported by the supporting shaft 180. The spring 178 is arranged such that one end (i.e., left end) thereof contacts a frame of the printer 11, while the other end (i.e., right end) thereof contacts a left surface of the slidable member 171. That is, the spring 178 urges the slidable member 171 and the lever 177 which contacts and urges the slidable member 171 rightward. The spring 179 is arranged such that one end (i.e., right end) thereof contacts the frame of the printer 11, while the other end (i.e., left end) thereof contacts the right surface of the lever 177. That is, the spring 179 urges the lever 177 and the slidable member 171, which contacts the lever 177, leftward. Further, it is noted that the urging force of the spring 179 is greater than that of the spring 178.

The switching mechanism 170 is in the first driving state (see FIG. 5A) when the carriage 23 is spaced from the lever 177. The lever 177, which is pushed rightward by the carriage 23, moves rightward against the urging force of the spring 179. With this movement, the slidable member 171 moves rightward, with following movement of the lever 177, by the urging force of the spring 178. As a result, the switching mechanism 170 changes its state from the first driving state (see FIG. 5A) to the second driving state (see FIG. 5B).

When the carriage 23 is spaced from the lever 177 shown in FIG. 5B, the slidable member 171 and the lever 177 move leftward by the urging force of the spring 179. As a result, the switching mechanism 170 changes its state from the second driving state (see FIG. 5B) to the first driving state (see FIG. 5A). That is, the state of the switching mechanism 170 varies depending on whether the carriage 23 contacts the lever 177 or not. In other words, a destination of the driving forces of the feeding motor 101 and the conveying motor 102 are switched by the movement of the carriage 23.

<Scanner>

The scanner 90 is configured to execute a reading operation to read an image formed on an original and generate image data. The scanner 90 has, as shown in FIGS. 1 and 6, a contact glass 91 which supports the original, a reading sensor 92 configured to read an image formed on the sheet which is supported on the contact glass 91, an FB (flatbed) cover 93 which is arranged above the contact glass 91 so as to be openable/closeable with respect to the scanner 90, and a cover sensor 94 configured to detect a position of the FB cover 93. It is noted that the scanner 90 is a so-called flatbed type scanner. Optionally, an ADF (auto document feeder) may be provided onto an upper surface of the FB cover 93.

The contact glass 91 supports the original thereon. The contact glass 91 is formed of translucent material. The contact glass 91 is an example of a supporting table configured to support the original on its upper surface. The reading sensor 92 is arranged below the contact glass 91 and located at a position to face the contact glass 91. The reading sensor 92 is configured to be moved by a scanner motor 104 (see FIG. 6) in the right-left direction 9, which is an example of a reading direction, between a standby position (i.e., the left end of FIG. 1A) and a returning position (i.e., the right end of FIG. 1A). Further, the reading sensor 92 has at least a light receiving element. It is noted that, as to a light source, the reading sensor 92 is not necessarily be provided with the same, and the light source may be arranged inside the scanner 90.

The reading sensor 92 is configured such that, when the reading sensor 92 is moved from the standby position to the returning position by the scanner motor 104, the image formed on the original supported on the contact glass 91 is read with a plurality of light receiving elements. Specifically, the image formed on the original is illuminated by light emitted by the light source, and reflected light is received by the plurality of light receiving elements, thereby the image being read. When the image has been read with use of the plurality of light receiving elements, the reading sensor 92 is moved, by the scanner motor 104, from the returning position to the standby position.

The FB cover 93 is configured to move between the opening position (see FIG. 1A) and the closing position (see FIG. 1B). It is noted that, the FB cover 93 is rotatably supported on an outer peripheral portion of the scanner 90. When the FB cover 93 is located at the opening position, the upper surface of the contact glass 91 is exposed to outside. Accordingly, when the FB cover 93 is located at the opening position, the user can place the original sheet on the contact glass 9 and/or remove the original placed on the contact glass 91. When the FB cover 93 is located at the closing position, the FB cover 93 covers the upper surface of the contact glass 91.

The cover sensor 94 is configured to detect the location of the FB cover 93. Specifically, the cover sensor 94 is configured to output different detection signals depending on the location of the FB cover 93. The cover sensor 94 transmits a high-level signal (hereinafter, referred to as an opening signal) to the controller 130 when the FB cover 93 is located at the opening position, while the cover sensor 94 transmits a low-level signal (hereinafter, referred to as a closing signal) to the controller 130 when the FB cover 93 is located at the closing position.

<Controller>

The controller 130 has a CPU (central processing unit) 131, a ROM (read only memory) 132, a RAM (random access memory) 133, EEPROM (electrically erasable programmable ROM) 134 and ASIC (application specific integrated circuit) 135, which are interconnected via a bus 137, as shown in FIG. 6. The ROM 132 stores programs to be executed by the CPU 131 to control operations of the MFP 10. The RAM 133 is used as a storage area in which the CPU 131 temporarily stores data, signals and the like when the CPU 131 executes respective programs stored in the ROM 132. The RAM 133 is also used as a work area when the CPU 131 processes data. The EEPROM 134 stores setting information and the like which should be retained after the MFP 10 is powered off.

The ASIC 135 is connected with the feeding motor 101, the conveying motor 102, the carriage motor 103 and the scanner motor 104. The ASIC 135 generates driving signals to rotate respective motors, and controls the motors based on the driving signal, respectively. Each motor is configured to forwardly or reversely in accordance with the driving signal transmitted from the ASIC 135. The controller 130 is configured to control the inkjet head 39 to eject the ink through the nozzles 40.

Further, an operation panel 17 is also connected to the ASIC 135. The operation panel 17 is configured to transmit an operation signal corresponding to a user operation to the controller 130. The operation panel 17 may have depression buttons and/or a touch sensor overlaid on a display. The controller 130 controls each of the motors 101-104 and the inkjet head 39 in accordance with operation signals transmitted from the operation panel 17. Further, the controller 130 is configured to receive a user operation to designate an operation mode, according to which the scanner 90 is controlled to execute the scanning operation, through the operation panel 17. There are two operation modes, which a first mode and a second mode in which a scan execution time is longer than that in the first mode.

Further, the ASIC 135 is connected with the registration sensor 120, the rotary encoder 121, the carriage sensor 38, and the cover sensor 94. The controller 130 detects the position of the sheet 12 based on the detection signal transmitted from the registration sensor 120 and the pulse signal transmitted from the rotary encoder 121. Further, the controller 130 detects the position of the carriage 23 based on the pulse signal transmitted from the carriage sensor 38. Furthermore, the controller 130 detects the position of the FB cover 93 based on the detection signal transmitted from the cover sensor 94.

<Copying Process>

Hereinafter, a copying process will be described referring to FIGS. 7-9. It is noted that the copying process includes a scanning process in which the scanner 90 is caused to execute the reading operation. Further, the copying process includes the print process to cause the printer 11 to execute the printing operation to print the image data generated in the reading operation. It is noted that respective processes described below may be executed as the CPU 131 retrieves programs stored in the ROM 132, or realized by hardware circuits implemented to the controller 130. Further, an execution order of respective processes may be changed within such a range as not change the scope of the present disclosures.

The controller 130 executes the scanning process shown in FIG. 7. As shown in FIG. 7, at the beginning of the scanning process, the controller 130 terminates the scanning process in response to no change of the detection signal output by the cover sensor 04 (S11: NO). Thereafter, the controller 130 re-starts the scanning process at a particular control timing.

The controller 130 starts a pre-reading process (S12) in response to change of the detection signal output by the cover sensor 94 from the closing signal to the opening signal (i.e., the position of the FB cover 93 being moved from the closing position to the opening position) (S11: YES). The pre-reading process is to bring the scanner 90 in a state to execute the reading operation. For example, the pre-reading process includes a light amount adjustment process, a process to detect presence/absence of the original sheet on the contact glass 91, a process of detecting the size of the original sheet, and a process of detecting the placed orientation of the original sheet.

Optionally, the controller 130 may be configured to execute the pre-reading process in response to change of the detection signal output by the cover sensor 94 from the opening signal to the closing signal in S11. In this case, the controller 130 may executes the pre-reading process in response to the change of the detection signal output by the cover sensor 94.

The controller 130 executes the following operations in the light amount adjustment process. Firstly, the controller 130 causes a light source of the scanner to emit light having a particular intensity to a plate provided at the first position. Next, the controller 130 measures a light reception level of the light, which is reflected by the plate and received by the light receiving element. Then, the controller 130 adjusts the intensity of the light emitted by the light source so that the measured light reception level is equal to a particular reference value. It is noted that a color of the plate is a reference color (e.g., white) of which brightness value is higher than that of the normal sheet 12. It is noted that the first position is a position which is different from the position of the contact glass 91 and at which the plate can face the reading sensor 92.

The controller 130 causes the reading sensor 92 located at the second position to detect the presence/absence of the original, the size of the original and the orientation of the original in the pre-reading process. Further, the controller 130 causes the scanner motor 104 to move the reading sensor 92 to the standby position. It is noted that the second position is a position at which the reading sensor 92 is covered with the original regardless of the size of the original placed on the contact glass 91.

The controller 130 waits for reception of a copy instruction through the operation panel 17 (S13), while executing the pre-reading process. The copy instruction is an instruction to print an image which is formed on the original placed on the contact glass 91 onto the sheet 12. In response to receipt of the copy instruction through the operation panel 17 (S13: YES), the controller 130 determines whether the pre-reading process has been finished (S14). According to FIG. 7, receipt of the copy instruction occurs earlier than finish of the pre-reading. However, according to aspects of the disclosures, whichever one of a timing at which the copy instruction is input and a timing at which the pre-reading process is finished could be earlier than the other.

In response to receipt of the copy instruction through the operation panel 17, and in response to completion of the pre-reading process (S13: YES; and S14: YES), the controller 130 executes the reading process (S15). The reading process is a process of causing the scanner 90 to execute the reading operation in accordance with the operation mode designated by the user. When the reading operation starts, the scanner 90 causes the scanner motor 104 to move the reading sensor 92 from the standby position to the returning position, and during the movement of the reading sensor 92, the scanner 90 causes the reading sensor 92 to read the image formed on the original. The scanner 90 gradually generates the image data representing the image read by the reading sensor 92 with the movement of the reading sensor 92. Further, the scanner 90 causes the scanner motor 104 to move the reading sensor 92 having reached the returning position to the standby position.

It is noted that the controller 130 executes the print process shown in FIG. 8 in response to reception of the copy instruction through the operation panel 17 (S13: YES), regardless whether the pre-reading process is finished. That is, the controller 130 executes steps S14 onwards of FIG. 7 and steps S21 onward of FIG. 8 in parallel. In the print process, the controller 130 executes a standby period determining process (S21). The standby period determining process is a process of determining a time period from the reception of the copy instruction to start of a pre-print process (described later) in accordance with the operation mode of the reading operation.

Referring to FIG. 9, the standby period determining process will be described in detail. The controller 130 obtains a reading condition, which includes a reading resolution and an orientation of the original (hereinafter, referred to as an original orientation). The reading resolution represents a resolution of image data which is generated by the scanner 90. The original orientation represents a relationship between the original placed on the contact glass 91 and the reading direction. It is noted that the original orientation is one of a "long direction" meaning that a longer side of the original is aligned along the reading direction and a "short direction" meaning that a shorter side of the original is aligned along the reading direction. The reading resolution and the original orientation are, for example, designated by the user through the operation panel 17.

The controller 130 obtains a printing condition in S32. It is noted that the printing condition obtained in S32 includes, for example, an orientation of the sheet (hereinafter, referred to as a sheet orientation) and a post-ejection period. The sheet orientation is information indicating a relationship between the orientation of the sheet 12 conveyed to the position facing the printer assembly 24 and the main scanning direction. The sheet orientation is one of a "long direction" meaning that a longer side of the sheet 12 is aligned along the main scanning direction and a "short direction" meaning that a shorter side of the sheet 12 is aligned along the main scanning direction. The post-ejection period is an elapsed time since the ink was lastly ejected from the inkjet head 39. The sheet orientation has been, for example, designated by the user in advance through the operation panel 17. It is noted that the post-ejection period is a period measured, for example, by the ASIC 135.

Next, in response to the reading resolution obtained in S31 being less than a threshold resolution (S33: LOW), the controller 130 determines a first value as an execution period T1 (S34). Further, in response to the reading resolution obtained in S31 being equal to or greater than the threshold resolution (S33: HIGH), the controller 130 determines a second value, which is greater than the first value, as the execution period T1 (S35). It is noted that the execution period T1 represents a time period necessary for generating image data which is necessary to start an image printing process (described later) in the reading operation in accordance with the operation mode. Information containing the first value and the second value is store, for example, in the ROM 132 or the EEPROM 134.

That is, the controller 130 assumes that the execution period T1 of the reading operation which is executed at the reading resolution equal to or higher than the threshold resolution is longer than that of the reading operation which is executed at the reading resolution lower than the threshold resolution. In other words, the controller 130 makes the execution period T1 longer as the designated reading resolution is higher. It is noted that the reading resolution lower than the threshold resolution is an example of the first mode, while the reading resolution equal to or higher than the threshold resolution is an example of the second mode. A process configured by the operations of S33-S35 is an example of a first assuming process in which the execution period T1 is assumed in accordance with the operation mode.

Next, in response to the original orientation obtained in S31 matching the sheet orientation obtained in S32 (S36: YES), the controller 130 multiplies the execution period T1 determined in S34 or S35 by a coefficient a (S37). The coefficient a corresponds to, for example, the number of executions of ejection processes (S19) to print an image on a single sheet 12 (hereinafter, occasionally referred to as a pass number). The controller 130 skips S37 in response to the original orientation obtained in S31 not matching the sheet orientation obtained in S32 (S36: NO).

When the original orientation and the sheet orientation are coincide with each other (i.e., a so-called memory copy being executed), substantially an entire area of the original should be read in the reading process in order to start the image printing process. When the original orientation and the sheet orientation are not coincide with each other (i.e., a so-called direct printing being executed), an area of the original corresponding to a length of the nozzle surface along the conveying direction 16 (hereinafter, referred to as a pass) is to be read in the reading process in order to start the image printing process.

Thus, the controller 130 assumes that the execution period T1 of the reading operation when the original orientation is coincide with the sheet orientation is longer than that when the original orientation is not coincide with the sheet orientation. In other words, the controller 130 makes the execution period T be longer as an area of the original to be read is larger before the image printing process is started. It is noted that a state where the original orientation is not coincide with the sheet orientation is an example of the first mode, while a state where the original orientation is coincide with the sheet orientation is an example of the second mode.

Next, the controller determines a third value as an execution period T2 in response to the post-ejection period obtained in S32 being less than the threshold period (S38: SHORT) in S39. In response to the post-ejection period obtained in S32 being equal to or greater than the threshold period (S38: LONG), the controller 130 determines a fourth value as the execution period T2 (S40). It is noted that the execution period T2 represents a time period necessary for executing the pre-print process. Information containing the third value and the fourth value is stored, for example, in the ROM 132 or the EEPROM 134. A process realized by the steps S38-S40 is an example of a second assuming process to assume the execution period T2.

The pre-print process includes a flashing process in which the carriage 23 is moved to a position facing the ink receiver 75 and the inkjet head 39 is caused to eject the ink. The controller 130 makes an ejection amount of the ink in the flashing process be greater as the post-ejection period is longer. That is, the controller 130 makes the execution period T2 be longer as the post-ejection period is longer, or the execution period of the flashing process is longer.

Next, the controller 130 determines a remaining period T3 of the pre-reading process (S41). The controller 130 calculates the remaining period T3 by subtracting an elapsed time period from the start of the pre-reading process in S12 to the current time from a necessary time period, which is particularly determined, for executing the pre-reading process. It is noted that the process in S41 is an example of a third assuming process. Then, in S42, the controller 130 determines the standby period according to the following equation:

$$\text{Standby Period} = (T1 + T3) - T2.$$

It is noted that the process of S42 is an example of a calculation process.

It is noted that the standby period is a time period from reception of the copy instruction to the start of the pre-print process. The controller 130 determines the standby period such that the pre-reading process is finished before the image data required to start the image printing process is generated in the reading process. In other words, the controller 130 determines the standby period such that the pre-reading process is finished at the same time or immediately before the image data necessary for starting the image printing process is generated in the reading process.

It is noted that the standby period when the operation mode is the first mode is an example of the first period, and the standby period when the operation mode is the second mode is an example of the second period, which is longer than the first period.

Returning to FIG. 8, the controller 130 waits for execution of the pre-print process until the elapsed period since the copy instruction was received in S13 reaches the standby period determined in S21 (S22). In response to the standby period has elapsed since the copy instruction was received (S22: YES), the controller 130 executes the pre-print process (S23). The pre-print process is a process to bring the printer 11 into a state where the printing operation can be executed. It is noted that the state where the printing operation can be executed is, for example, a state where images having a particular or higher quality can be recorded. The pre-print process includes, for example, a boosting process, an uncapping process, a switching process, the aforementioned flashing process, a feeding process and a heading process. At a point of time when the pre-print process is started, the switching mechanism 170 is in the second driving state, and the cap 71 is located at the cap position.

The boosting process is a process to apply voltages to a power source circuit of the MFP 10 and to a head circuit of the inkjet head 39, for example, to charge a condenser of each circuit. The uncapping process is a process to drive the feeding motor 101 to move the cap 71 from the cap position to the uncap position. The switching process is a process to drive the carriage motor 103 to move the carriage 23 away from the lever 177, thereby change the state of the switching mechanism 170 from the second driving state to the first driving state.

The flashing process is a process to drive the carriage motor 103 to move the carriage 23 to a position facing the ink receiver 75, and cause the inkjet head 39 to eject the ink. The feeding process is a process to feed the sheets 12 supported on the feed tray 20 until the sheet 12 reaches the conveying roller assembly 54 with the feeding assembly 15 by driving the feeding motor 101. The heading process is a process to drive the conveying motor 102 to cause the conveying roller assembly 54 to convey the sheet 12, which has reached the conveying roller assembly 54, until the leading end of the sheet 12 is located at a position facing the inkjet head 39.

It is noted that there is no specific execution order of respective processes included in the pre-print process. However, the uncapping process should be executed before the switching process and the flashing process. Further, the boosting process and the switching process should be executed before the flashing process. Furthermore, the feeding process should be executed before the heading process. Typically, the controller 130 executes the boosting process, the uncapping process, the switching process and the flashing process in this order, while executes the flashing process, the feeding process and the heading process in parallel.

It is noted that the pre-reading process (S12-S14) and the pre-print process (S23) may be executed in parallel. Further, the reading process (S15) and the pre-print process (S23) may be executed in parallel. The reading process (S15) should be executed after the pre-reading process is completed (S14: YES). Further, the controller 130 executes the image printing process (S24-S27) in response to completion of at least a part of the reading process (S15) and the pre-print process (S23). That is, a part of the reading process (S15) and the image printing process (S24-S27) may be executed in parallel.

It is noted that "at least a part of the reading process" is a process in which the image data representing a part of an image subjected to an initial ejection process from the image formed on the original supported on the contact glass 91 is generated. When the operation mode is the direct copy mode, the image data necessary for the initial ejection process is the image data representing the part of the image to be recorded in the initial pass, or the image data representing $1/\alpha$ of the image formed on the original. When the operation mode is the memory copy, the image data necessary for the initial ejection process is the image data representing the entire image formed on the original.

The controller 130 causes the printer 11 to execute the printing operation (S24-S27) based on the image data generated in the reading process. It is noted that the process in steps S24-S27 is an example of the image printing process. The printing operation includes, for example, the ejection process (S24) and the conveying process (S26) which are executed alternately, and the discharging process (S27). The ejection process (S24) is a process to cause the inkjet head 39 to eject the ink to an area on the sheet 12 facing the inkjet head 39. The conveying process (S26) is a process to cause the conveying assembly to convey the sheet 12 by a particular conveying amount in the conveying direction. The discharging process (S27) is a process to causes the discharge roller assembly 55 to discharge the sheet 12 on which the image has been recorded onto the discharge tray 21. The number $a$ of executions of the ejecting process is, for example, determined based on the size the sheet orientation of the sheet 12.

The controller 130 drives the carriage motor 103 to move the carriage 23 from one of the sheet passage range to the other end, with causing the inkjet head 39 to eject ink droplets at appropriate timings (S24). Next, in response to the image data for the next pass having been generated in the reading process (S25: YES), the controller 130 drives the conveying motor 102 to cause at least one of the conveying roller assembly 54 and the discharge roller assembly 55 to convey the sheet 12 to a position at which an area on which the image of the next pass is to be formed faces the inkjet head 39. The controller 130 repeats the process of S24 and S26 until the images of all the passes are printed (S25: YES). Then, in response to the images of all the passes have been printed (S25: NO), the controller 130 controls the conveying motor 102 so that the discharge roller assembly 55 discharges the sheet 12 onto the discharge tray 12 (S27).

The standby period from the reception of the copy instruction to the start of the pre-printing operation is changed in accordance with the execution of the reading operation, which is different based on the operation mode. With this configuration, since the end of the pre-printing operation is deferred, it becomes possible to suppress elongation of the FCOT. It is also noted that drying of the ink inside the uncapped inkjet head 39 which is uncapped as the pre-printing operation was finished too early. As a result, the FCOT can be shortened, and drying of the ink inside the inkjet head 39 can be suppressed.

The length of the execution period T1 of the reading process varies depending on the operation mode. Similarly, the execution period T2 of the pre-print process varies depending on the post-ejection period. Therefore the execution periods T1 and T2 are respectively assumed based on various parameters, and (T2−T1) is determined as the standby period. With this configuration, a timing at which the image data necessary for starting the image printing process is generated and a timing at which the pre-print process is finished are made to be close to each other. As a result, the FCOT can be shortened, and drying of the ink inside the inkjet head 39 can be suppressed.

As one example, the execution period T1 is assumed taking the reading resolution into consideration (S33-S35), accuracy in length of the execution period T1 is raised. As another example, the execution period T1 is assumed taking an area of the original to be read into consideration before the image printing process is started (S36, S37), accuracy in length of the execution period T1 is raised. As a result, a timing at which the image data necessary for starting the image printing process is generated and a timing at which the pre-print process is finished are made to be closer to each other. It is noted that a process of steps S33-S35 or a process of S36 and S27 may be omitted.

As a further example, the execution period T2 is assumed taking the execution period of the flashing process (S38-S40), accuracy in length of the execution period T2 is raised. As a result, it becomes possible that a time at which the image data necessary to start the image printing process is generated and a time at which the pre-print process is finished are closer to each other. Further, since the flashing process, the feeding process and the heading process are executed in parallel in the pre-print process, a time period from completion of the pre-print process to the start of the image printing process can be shortened.

It is noted that a method of assuming the execution periods T1 and T2 is not limited to that described above. As an example, the controller 130 may assume a particular fixed value as the execution period T1 in the first assuming process. For example, different fixed values may be stored in the ROM 132 or the EEPROM 134 in association with the reading resolution, the original orientation and the sheet orientation. Further, the controller 130 may select one of the fixed values based on the reading condition and printing condition included in the copy instruction, and assumes the selected fixed value as the execution period T1. Further, in S37, it is defined that T1=T1×α. However, a calculation method needs not be limited to the described one, and another equation such as T1=T1+t may be employed.

Similarly, the controller 130 may assume a particular fixed value as the execution period T2 in the second assuming process. As another example, the controller 130 may measure actual execution periods of respective processes every time when the reading process and the pre-print process are executed, and store the measured execution periods in the EEPROM 134. In such a case, the controller 130 may assume an average value of the execution periods of the past reading processes as the execution period T1 in the first assuming process Similarly, the controller 130 may assume an average value of the execution periods of the past pre-print processes as the execution period T2 in the second assuming process.

The calculation method of the execution period needs not be limited to the above-described ones. For example, the calculation method of the execution period may be modified based on the operation mode of the reading operation. That is, the controller 130 may calculate the execution period in accordance with the above-described method when the operation mode is the second mode, while the controller 130 may determine the remaining period T3 assumed in S41 as the execution period when the operation mode is the first mode. That is, the controller 130 may start the reading process and the pre-print process at the same time in response to completion of the pre-reading process.

If a time period after the FB cover 93 is located to the closing position till the copy instruction is received is short, the pre-reading process may not be completed at a timing when the copy instruction is received. If the standby period is determined taking the remaining period T2 of the pre-reading process into account, drying of the ink could further be suppressed. In this case, it is noted that S41 can be omitted.

What is claimed is:

1. An inkjet printing apparatus, comprising:
a scanner;
an inkjet head;
a cap configured to cap the inkjet head;
an operation panel; and
a controller,
the controller being configured to execute:
    a reading process in which the controller causes the scanner to execute a reading operation to read an image formed on an original and generate image data representing the read image in accordance with an operation mode input through the operation panel in response to reception of a copy instruction to print the read image onto a sheet;
    a determining process in which the controller determines a standby period corresponding to the operation mode;
    a pre-print process in which the controller separates the cap and the inkjet head in response to elapse of the standby period since the copy instruction was received;
    an image printing process in which the controller causes the inkjet head to execute a printing operation based on the image data in response to completion of at least a part of the reading process and completion of the pre-print process,
wherein the controller is configured to determine the standby period, during which the pre-print process executed in parallel with the reading process is completed before the image data necessary to start the image printing process is generated in the reading process, to be:
    a first period in response to the operation mode being a first mode; and
    a second period, which is longer than the first period, in response to the operation mode being a second mode, an execution period of the reading operation being longer in the second mode than in the first mode.

2. The inkjet printing apparatus according to claim 1,
wherein, in the determining process, the controller executes:
a first assuming process to assume an execution period T1 during which the image data necessary to start the image printing process according to the operation mode;
a second assuming process to assume an execution period T2 of the pre-print process; and
a calculation process to calculate a difference T1—T2 as the standby period.

3. The inkjet printing apparatus according to claim 2,
wherein the scanner comprises:
    a supporting table configured to support the original;
    a reading sensor configured to read an image formed on the original placed on the supporting table;
    a cover movable between an opening position at which the supporting table is exposed to outside and a closing position at which the cover covers the supporting table; and a cover sensor configured to output different detection signals in response to the cover being located to the opening position or the closing position, wherein the controller is further configured to execute:
a pre-reading process causing the scanner to be in a state to execute the reading operation in response to the detection signal output by the cover sensor being changed;
the reading process in response to reception of the copy instruction and completion of the pre-reading process, wherein, in the determining process, the controller is further configured to execute:
a third assuming process to assume a remaining period T3 of the pre-reading process; and
the calculation process to calculate (T1+T3)—T2 as the standby period.

4. The inkjet printing apparatus according to claim 3,
wherein a reading resolution by the reading sensor is higher in the second mode than in the first mode, and
wherein the controller is configured to make the execution period T1 in the second mode being longer than the execution period T1 in the first mode, in the first assuming process.

5. The inkjet printing apparatus according to claim 3, further comprising:
a conveying assembly configured to convey the sheet having a rectangular shape in a conveying direction; and
wherein the inkjet head is configured to move in a main scanning direction which is perpendicular to the conveying direction,
wherein the first mode is the operation mode in which a longer side direction of a rectangular original is aligned with the conveying direction, while a longer side direction of the sheet is aligned with the main scanning direction, or in which a shorter side direction of the rectangular original is aligned with the conveying direction, while a shorter side direction of the sheet is aligned with the main scanning direction,
wherein the second mode is the operation mode in which the longer side direction of the rectangular original is aligned with the conveying direction, while the shorter side direction of the sheet is aligned with the main scanning direction, or in which the shorter side direction of the rectangular original is aligned with the conveying direction, while the longer side direction of the sheet is aligned with the main scanning direction,
wherein, in the image printing process, the controller is further configured to repeatedly execute:
a conveying process to cause the conveying assembly to convey the sheet in the conveying direction by a particular amount, and
an ejecting process to cause the inkjet head to eject ink droplets with moving the inkjet head in the main scanning direction,
wherein, in the first assuming process, the controller makes the execution period T1 in the second mode be longer than the execution period T1 in the first mode.

6. The inkjet printing apparatus according to claim 5,
wherein the controller is configured to assume, in the first assuming process, that the execution period T1 in the first mode multiplied by a which is the number of times of repetition of the ejection process in the image printing process is the execution period T1 in the second mode.

7. The inkjet printing apparatus according to claim 5,
wherein the controller is configured to calculate, in the calculation process in the first mode, T3 as the standby period, and
wherein the controller is configured to calculate, in the calculation process in the second mode, (T1+T2)−T3 as the standby period.

8. The inkjet printing apparatus according to claim 5,
further comprising an ink receiver to receive ink ejected by the inkjet head, the ink receiver arranged at a position outside a sheet passage range in the man scanning direction,
wherein the controller is configured to:
execute, in the pre-print process, a flashing process to cause the inkjet head to eject the ink at a position to face the ink receiver, the flashing process being executed longer as an elapse time after the inkjet head previously ejected the ink is longer.

9. The inkjet printing apparatus according to claim 8,
wherein the controller is configured to execute a heading process to cause the inkjet head to convey the sheet to the conveying assembly until the sheet reaches a position at which the sheet faces the inkjet head in the pre-print process, in parallel with the flashing process.

10. The inkjet printing apparatus according to claim 8, further comprising:
a sheet tray; and
a sheet feeder configured to feed the sheet on the sheet tray toward the conveying assembly,
wherein the controller is configured to execute a feeding process to cause the sheet feeder to feed the sheet until the sheet reaches the conveying assembly in parallel with the flashing process.

11. An inkjet printing apparatus comprising:
a scanner;
an inkjet head;
a cap configured to cap the inkjet head;
an operation panel; and
a controller configured to:
receive a copy instruction including an operation mode information through the operation panel;
in response to reception of the copy instruction, start to cause the scanner to read an image formed on an original;
based on the operation mode information, cause the scanner to read the image at a specified speed;
generate image data representing the read image;
based on the operation mode information, determine a standby period;
in response to elapse of the determined standby period from the reception of the copy instruction, separate the cap and the inkjet head; and
after completion of separating the cap from the inkjet head, cause the inkjet head to eject ink droplets to print an image corresponding to the read image based on the image data.

12. A method implemented by a controller of an inkjet printing apparatus including a scanner, an inkjet head, a cap for the inkjet head, and an operation panel, comprising step of;
receiving a copy instruction including an operation mode information through the operation panel;
in response to receipt of the copy instruction, starting to cause the scanner to read an image formed on an original;
based on the operation mode information, causing the scanner to read the image at a specified speed;

generating image data representing the read image;
based on the operation mode information, determine a standby period;
in response to elapse of the determined standby period from the reception of the copy instruction, separating the cap and the inkjet head; and
after completion of separating the cap from the inkjet head, causing the inkjet head to eject ink droplets to print an image corresponding to the read image based on the image data.

* * * * *